(12) United States Patent
Cannan et al.

(10) Patent No.: US 10,701,932 B2
(45) Date of Patent: Jul. 7, 2020

(54) COMPOSITION COMPRISING DICAMBA AND A DRIFT CONTROL AGENT COMPRISING AT LEAST ONE FATTY ALCOHOL

(71) Applicant: BASF SE, Ludwigshafen (DE)

(72) Inventors: Terrance Cannan, Raleigh, NC (US); Maarten Staal, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/104,413

(22) PCT Filed: Dec. 17, 2014

(86) PCT No.: PCT/EP2014/078172
§ 371 (c)(1),
(2) Date: Jun. 14, 2016

(87) PCT Pub. No.: WO2015/091617
PCT Pub. Date: Jun. 25, 2015

(65) Prior Publication Data
US 2016/0309713 A1    Oct. 27, 2016

Related U.S. Application Data

(60) Provisional application No. 61/917,357, filed on Dec. 18, 2013.

(30) Foreign Application Priority Data

Jan. 23, 2014   (EP) .................................... 14152255

(51) Int. Cl.
*A01N 37/40* (2006.01)
*A01N 25/00* (2006.01)
*A01N 25/30* (2006.01)
*A01N 57/20* (2006.01)

(52) U.S. Cl.
CPC ............. *A01N 37/40* (2013.01); *A01N 25/00* (2013.01); *A01N 25/30* (2013.01); *A01N 57/20* (2013.01)

(58) Field of Classification Search
None
See application file for complete search history.

(56) References Cited

U.S. PATENT DOCUMENTS

| 5,385,750 | A | * | 1/1995 | Aleksejczyk | .......... | A01N 25/30 |
| | | | | | | 106/15.05 |
| 2012/0142532 | A1 | | 6/2012 | Wright et al. | | |
| 2013/0225405 | A1 | | 8/2013 | Hixson et al. | | |

FOREIGN PATENT DOCUMENTS

| JP | S53113029 A | 10/1978 | | |
| JP | 2013541573 A | 11/2013 | | |
| WO | WO 2002034047 | 5/2002 | | |
| WO | WO 2012059494 A1 | * | 5/2012 | ............. A01N 25/02 |

OTHER PUBLICATIONS

International Search Report, issued in PCT/EP2014/078172, dated Mar. 19, 2015.
International Preliminary Report on Patentability, issued in PCT/EP2014/078172, dated Jun. 21, 2016.

* cited by examiner

*Primary Examiner* — Alton N Pryor
(74) *Attorney, Agent, or Firm* — Marshall, Gerstein & Borun LLP

(57) ABSTRACT

The present invention relates to compositions comprising dicamba and a drift control agent, wherein the drift control agent comprises at least one fatty alcohol. The present invention further relates to a method for preparing a tank mix and to a method of plant, seed and/or soil treatment. The present invention also relates to the use of at least one fatty alcohol for reducing the wind drift of a composition comprising a pesticide.

12 Claims, No Drawings

COMPOSITION COMPRISING DICAMBA AND A DRIFT CONTROL AGENT COMPRISING AT LEAST ONE FATTY ALCOHOL

This application is a National Stage application of International Application No. PCT/EP2014/078172, filed Dec. 17, 2014, which claims the benefit of U.S. Provisional Application No. 61/917,357, filed Dec. 18, 2013. This application also claims priority under 35 U.S.C. § 119 to European Patent Application No. 14152255.7, filed Jan. 23, 2014.

BACKGROUND OF THE INVENTION

The reduction of wind drift is an important object in agrochemistry. As different plants require different agrochemicals as pesticides that may not necessarily be beneficial for other plants of neighboring fields, there is a need to highly control the distribution of agrochemicals and prevent a drift to neighboring fields or the neighboring environment in general. Various drift control agents are known with a wide variety of different chemical compositions. Thus, it is very difficult to identify new drift control agents or optimizing structures of known drift control agents.

Dicamba is an important herbicide, which requires high drift control to avoid damages in neighboring fields. Dicamba is available in the commercial products like BANVEL®+2,4-D, BANVEL HERBICIDE®, BANVEL-K+ATRAZINE®, BRUSHMASTER®, CELEBRITY PLUS®, CIMARRON MAX®, CLARITY HERBICIDE®, COOL POWER®, DIABLO HERBICIDE®, DICAMBA DMA SALT, DISTINCT HERBICIDE®, ENDRUN®, HORSEPOWER*®, LATIGO®, MARKSMAN HERBICIDE®, MACAMINE-D®, NORTHSTAR HERBICIDE®, OUTLAW HERBICIDE®, POWER ZONE®, PROKOZ VESSEL®, PULSAR®, Q4 TURF HERBICIDE®, RANGESTAR®, REQUIRE Q®, RIFLE®, RIFLE PLUS®, RIFLE-D®, SPEED ZONE®, STATUS HERBICIDE®, STER-LING BLUE®, STRUT®, SUPER TRIMEC*®, SURGE*®, TRIMEC BENTGRASS*®, TRIMEC CLASSIC*®, TRIMEC PLUS*®, TRIPLET SF®, TROOPER EXTRA®, VANQUISH®, VETERAN 720®, VISION HERBICIDE®, WEED MASTER®, YUKON HERBICIDE®.

Object of the present invention was to find a new drift control agent and compositions thereof with improved properties. These agents should be easy to prepare starting from cheap, industrially available compounds, which are easy to handle. Yet another object was to provide a dicamba composition which allows drift control.

SUMMARY OF THE INVENTION

The object was solved by a composition comprising dicamba and a drift control agent comprising at least one fatty alcohol.

Further, the present invention relates to compositions comprising dicamba and a drift control agent, wherein the drift control agent comprises a combination of at least one fatty alcohol and at least one alkoxylated fatty alcohol.

The object was also solved by a use of at least one fatty alcohol for reducing the wind drift of aqueous compositions comprising a pesticide.

Further, the objective was solved by a method of drift control, wherein the composition is allowed to act on the pests, and/or the plants to be protected and/or undesired plants and/or the soil and/or their environment.

DETAILED DESCRIPTION

The present invention relates to compositions of dicamba or salt thereof and a drift control agent.

The composition according to the present invention comprises at least 1 wt. %, preferably at least 5 wt. %, and in particular at least 10 wt. % of the drift control agent. Moreover, the composition contains up to 50 wt. %, preferably up to 30 wt. %, and in particular up to 20 wt. % drift control agent. The wt. % is based on the weight of the composition.

In a preferred embodiment, the composition comprises from about 3 wt. % to about 35 wt. % drift control agent.

The drift control agent of the present invention comprises at least one fatty alcohol. Preferably, the fatty alcohol is a saturated fatty alcohol, an unsaturated fatty alcohol or a mixture thereof. Even more preferably, the at least one fatty alcohol is a $C_{12}$-$C_{22}$-fatty alcohol.

In an even more preferred embodiment, the saturated or unsaturated fatty alcohol is selected from the group consisting of cetyl alcohol, myristic alcohol, arachidyl alcohol, oleyl alcohol or a mixture thereof.

In one preferred embodiment, the drift control agent of the present invention essentially consists of at least one fatty alcohol.

In another embodiment, the drift control agent essentially consists of cetyl alcohol, myristic alcohol, arachidyl alcohol, oleyl alcohol or a mixture thereof.

In yet another preferred embodiment, the drift control agent is a mixture of cetyl alcohol, myristic alcohol, arachidyl alcohol and oleyl alcohol.

In a preferred embodiment, the drift control agent mixture comprises at least 40 wt. % of at least one fatty alcohol, at least 50 wt. % of at least one fatty alcohol, at least 60 wt % of at least one fatty alcohol, or at least 65 wt % of at least one fatty alcohol based on the weight of the drift control agent.

In a preferred embodiment, the drift control agent mixture comprises at least 70 wt. % of at least one unsaturated fatty alcohol, more preferably at least 80 wt. % and most preferably at least 87 wt. % of at least one unsaturated fatty alcohol based on the weight of the drift control agent. Preferably, the unsaturated fatty alcohol is oleyl alcohol.

In another preferred embodiment, the drift control agent comprises from about 80 wt. % to about 98 wt. % at least one unsaturated fatty alcohol, and preferably from about 85 wt. % to about 97 wt. % unsaturated fatty alcohol based on the weight of the drift control agent. Preferably, the at least one unsaturated fatty alcohol is oleyl alcohol.

In yet another preferred embodiment, the drift control agent comprises
i. from about 80 wt. % to about 98 wt. % oleyl alcohol and preferably from about 85 wt. % to 96 wt. % oleyl alcohol;
ii. from about 1 wt. % to about 15 wt. % cetyl alcohol and preferably from about 1.5 wt. % to about 10 wt. % cetyl alcohol;
iii. from about 0 wt. % to about 4 wt. % myristic alcohol; and preferably from about 0 wt. % to about 2 wt. % myristic alcohol;
iv. from 0 wt. % and 6 wt. % arachidyl alcohol and preferably from 0 wt. % and 3 wt. % arachidyl alcohol, and wherein the wt. % are based on the weight of the drift control agent.

In an even more preferred embodiment, the wt. % sum of above options i to iv represent at least about 81 wt. % and preferably, at least about 89 wt. % of the drift control agent. In a particularly preferred embodiment, the wt. % sum of options i to iv represent 100 wt. % of the drift control agent.

Dicamba (3,6-dichloro-2-methoxybenzoic acid) is a known herbicide, which may be present in form of a protonated acid, in form of a salt, or a mixture thereof. Various dicamba salts may be used, such as dicamba sodium, dicamba dimethylamine, dicamba diglycolamine.

Preferably, dicamba is present in form of a dicamba salt or a solution thereof. More preferably, dicamba is present in form of a dicamba polyamine salt and the polyamine has the formula (A1)

(A1)

wherein $R^1$, $R^2$, $R^4$, $R^6$, and $R^7$ are independently H or $C_1$-$C_6$-alkyl, which is optionally substituted with OH,
$R^3$ and $R^5$ are independently $C_2$-$C_{10}$-alkylene,
X is OH or $NR^6R^7$, and
n is from 1 to 20;
or the formula (A2)

(A2)

wherein $R^{10}$ and $R^{11}$ are independently H or $C_1$-$C_6$-alkyl,
$R^{12}$ is $C_1$-$C_{12}$-alkylene, and
$R^{13}$ is an aliphatic $C_5$-$C_8$ ring system, which comprises either nitrogen in the ring or which is substituted with at least one unit $NR^{10}R^{11}$.

The dicamba polyamine salt usually comprises an anionic dicamba and a cationic polyamine.

In an embodiment the cationic polyamine has the formula

(A1)

wherein $R^1$, $R^2$, $R^4$, $R^6$, $R^7$ are independently H or $C_1$-$C_6$-alkyl, which is optionally substituted with OH, $R^3$ and $R^5$ are independently $C_2$-$C_{10}$-alkylene, X is OH or $NR^6R^7$, and n is from 1 to 20. $R^1$, $R^2$, $R^4$, $R^6$ and $R^7$ are preferably independently H or methyl. Preferably, $R^1$, $R^2$, $R^6$ and $R^7$ are H. $R^6$ and $R^7$ are preferably identical to $R^1$ and $R^2$, respectively. $R^3$ and $R^5$ are preferably independently $C_2$-$C_3$-alkylene, such as ethylene (—$CH_2CH_2$—), or n-propylene (—$CH_2CH_2CH_2$—). Typically, $R^3$ and $R^5$ are identical. $R^3$ and $R^5$ may be linear or branched, unsubstituted or substituted with halogen. Preferably, $R^3$ and $R^5$ are linear. Preferably, $R^3$ and $R^5$ are unsubstituted. X is preferably $NR^6R^7$. Preferably, n is from 1 to 10, more preferably from 1 to 6, especially from 1 to 4. In another preferred embodiment, n is from 2 to 10. Preferably, $R^1$, $R^2$, and $R^4$ are independently H or methyl, $R^3$ and $R^5$ are independently $C_2$-$C_3$-alkylene, X is OH or $NR^6R^7$, and n is from 1 to 10.

The group X is bound to $R^5$, which is a $C_2$-$C_{10}$-alkylene group. This means that X may be bound to any carbon atom of the $C_2$-$C_{10}$-alkylene group. Examples of a unit —$R^5$—X are —$CH_2$—$CH_2$—$CH_2$—OH or —$CH_2$—CH(OH)—$CH_3$.

Preferably, $R^1$, $R^2$, $R^4$, $R^6$, $R^7$ are independently H or $C_1$-$C_6$-alkyl.

In another preferred embodiment the cationic polymer of the formula (A1) is free of ether groups (—O—). Ether groups are known to enhance photochemical degradation resulting in explosive radicals or peroxy groups.

Examples for cationic polyamines of the formula (A1) wherein X is $NR^6R^7$ are diethylenetriamine (DETA, (A4) with k=1, corresponding to (A1.1)), triethylenetetraamine (TETA, (A4) with k=2), tetraethylenepentaamine (TEPA, (A4) with k=3). Technical qualities of TETA are often mixtures comprising in addition to linear TETA as main component also tris-aminoethylamine TAEA, Piperazino-ethylethylenediamine PEEDA and Diaminoethylpiperazine DAEP. Technical qualities of TEPA a are often mixtures comprising in addition to linear TEPA as main component also aminoethyltris-aminoethylamine AE-TAEA, aminoethyldiaminoethylpiperazine AE-DAEP and aminoethylpiperazinoethylethylenediamine AE-PEEDA. Such ethyleneamines are commercially available from Dow Chemical Company. Further examples are Pentamethyldiethylenetriamine PMDETA (B1.3), N,N,N',N'',N''-pentamethyl-dipropylenetriamine (B1.4) (commercially available as Jeffcat® ZR-40), N,N-bis(3-dimethylaminopropyl)-N-isopropanolamine (commercially available as Jeffcat® ZR-50), N'-(3-(dimethylamino)propyl)-N,N-dimethyl-1,3-propanediamine (A1.5) (commercially available as Jeffcat® Z-130), and N,N-Bis(3-aminopropyl)methylamine BAPMA (A1.2). Especially preferred are (A4), wherein k is from 1 to 10, (A1.2), (A1.4) and (A1.5). Most preferred are (A4), wherein k is 1, 2, 3, or 4 and (A1.2). In particular preferred are (A1.1) and (A1.2), wherein the latter is most preferred.

(A4)

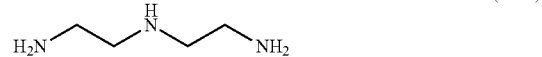

(A1.1)

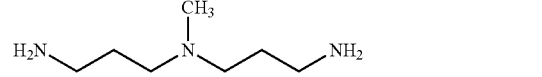

(A1.2)

(A1.3)

(A1.4)

(A1.5)

Examples for polyamines of the formula (A1) wherein X is OH are N-(3-dimethylaminopropyl)-N,N-diisopropanolamine DPA (A1.9), N,N,N'-trimethylaminoethyl-ethanolamine (A1.7) (commercially available as Jeffcat® Z-110), aminopropylmonomethylethanolamine APMMEA (A1.8), and aminoethylethanolamine AEEA (A1.6). Especially preferred is (A1.6).

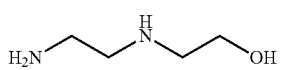
(A1.6)

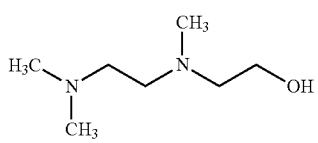
(A1.7)

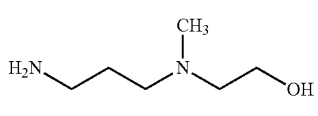
(A1.8)

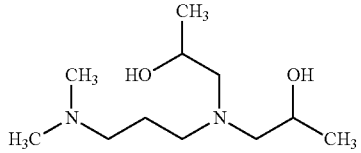
(A1.9)

In another embodiment the cationic polyamine has the formula

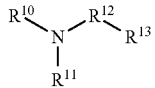
(A2)

wherein $R^{10}$ and $R^{11}$ are independently H or $C_1$-$C_6$-alkyl, $R^{12}$ is $C_2$-$C_{12}$-alkylene, and $R^{13}$ is an aliphatic $C_5$-$C_8$ ring system, which comprises either nitrogen in the ring or which is substituted with at least one unit $NR^{10}R^{11}$.

$R^{10}$ and $R^{11}$ are preferably independently H or methyl, more preferably H. Typically $R^{10}$ and $R^{11}$ are linear or branched, unsubstituted or substituted with halogen. Preferably, $R^{10}$ and $R^{11}$ are unsubstituted and linear. More preferably, $R^{10}$ and $R^{11}$ are identical.

$R^{12}$ is preferably $C_2$-$C_4$-alkylene, such as ethylene (—$CH_2CH_2$—), or n-propylene (—$CH_2CH_2CH_2$—). $R^{12}$ may be linear or branched, preferably it is linear. $R^{12}$ may be unsubstituted or substituted with halogen, preferably it is unsubstituted.

$R^{13}$ is an aliphatic $C_5$-$C_8$ ring system, which comprises either nitrogen in the ring or which is substituted with at least one unit $NR^{10}R^{11}$. Preferably, $R^{13}$ is an aliphatic $C_5$-$C_8$ ring system, which comprises nitrogen in the ring. The $C_5$-$C_8$ ring system may be unsubstituted or substituted with at least one $C_1$-$C_6$ alkyl group or at least one halogen. Preferably, the $C_5$-$C_8$ ring system is unsubstituted or substituted with at least one $C_1$-$C_4$ alkyl group. Examples for an aliphatic $C_5$-$C_8$ ring system, which comprises nitrogen in the ring, are piperazyl groups. Examples for $R^{13}$ being an aliphatic $C_5$-$C_8$ ring system, which comprises nitrogen in the ring, are the compounds of the formulat (A2.11) and (A2.12) below. Examples for $R^{13}$ being an aliphatic $C_5$-$C_8$ ring system, which is substituted with at least one unit $NR^{10}R^{11}$ is the compound of the formula (A2.10) below.

More preferably, $R^{10}$ and $R^{11}$ are independently H or methyl, $R^{12}$ is $C_2$-$C_3$-alkylene, and $R^{13}$ is an aliphatic $C_5$-$C_8$ ring system, which comprises oxygen or nitrogen in the ring. In another preferred embodiment the cationic polymer of the formula (A2) is free of ether groups (—O—).

Especially preferred cationic polyamines of formula (A2) are isophorone diamine ISPA (A2.10), aminoethylpiperazine AEP (A2.11), and 1-methyl-4-(2-dimethylaminoethyl)piperazine TAP (A2.12). These compounds are commercially available from Huntsman or Dow, USA. Preferred are (A2.10) and (A2.11), more preferably (A2.11). In another embodiment (A2.11) and (A2.12) are preferred.

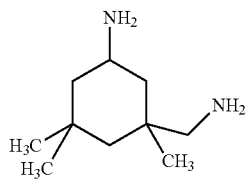
(A2.10)

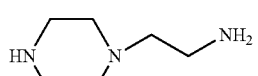
(A2.11)

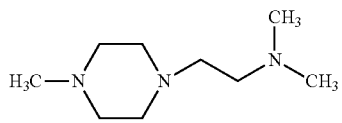
(A2.12)

In a particularly preferred embodiment, Dicamba is present in form of a N,N-bis(3-aminopropyl)methylamine (so called "BAPMA") salt.

In yet another embodiment the composition according to the present invention comprises at least 50 g/l acid equivalents (ae) of dicamba, preferably at least 300 g/l ae of dicamba, more preferably at least 400 g/l ae of dicamba, and in particular at least 450 g/l ae of dicamba. The composition comprises up to 800 g/l ae of dicamba, preferably up to 700 g/l ae of dicamba, more preferably up to 650 g/l ae of dicamba, and in particular up to 600 g/l ae of dicamba.

In another preferred embodiment, the composition according to the present invention comprises at least 200 g/l ae of dicamba.

The composition according to the invention is usually present in form of an homogeneous solution, e.g. at 20° C. The composition according to the invention is usually present in form of an aqueous solution, e.g. at 20° C.

In a preferred embodiment, the composition comprises at least 200 g/l acid equivalents of dicamba (e.g. as dicamba salt of the polyamine of the formula (A1)), at least 3 wt. % of the drift control agent, and water up to 100 wt. % wherein the wt. % are based on the weight of the composition.

In a preferred embodiment, the composition comprises at least 300 g/l acid equivalents of dicamba (e.g. as dicamba salt of the polyamine of the formula (A1)), at least 5 wt. % of the drift control agent, and water up to 100 wt. % wherein the wt. % are based on the weight of the composition.

In a more preferred embodiment, the composition contains at least 400 g/l acid equivalents of dicamba (e.g. as dicamba BAPMA salt), at least 8 wt % of the drift control agent, and water up to 100 wt. %, wherein the wt. % are based on the weight of the composition.

In another preferred embodiment, the composition may comprise additional pesticides in addition to dicamba. Even more preferred additional pesticides are herbicides, such as amino acid derivatives including bilanafos, glyphosate (e.g. glyphosate free acid, glyphosate ammonium salt, glyphosate isopropylammonium salt, glyphosate trimethylsulfonium salt, glyphosate potassium salt, glyphosate dimethylamine salt), glufosinate, sulfosate; or imidazolinones including imazamethabenz, imazamox, imazapic, imazapyr, imazaquin, imazethapyr; phenoxy acetic acids including clomeprop, 2,4-dichlorophenoxyacetic acid (2,4-D), 2,4-DB, dichlorprop, MCPA, MCPA-thioethyl, MCPB and Mecoprop.

More preferred additional pesticides are glyphosate and 2,4-D. The most preferred additional pesticide is glyphosate.

In an another preferred embodiment of the invention, the drift control agent comprises at least one fatty alcohol and further comprises at least one fatty alcohol alkoxylate, such as an alkoxylate of the formula (I)

$$R^a-O-(C_mH_{2m}-O)_n-H \quad (I)$$

wherein $R^a$ is $C_6$-$C_{22}$-alkyl and/or -alkenyl, m is 2, 3, 4 or a mixture thereof, and n is from 1 to 15. The alkoxylates of the formula (I) are obtainable by common alkoxylation of alcohols $R^a$—OH, e.g. with ethylene oxide (resulting in m=2), propylene oxide, or butylene oxide. $R^a$ may be an alkyl, alkenyl or a mixture thereof. Preferably $R^a$ is an alkenyl or a mixture of an alkenyl with an alkyl. In case $R_a$ contains an alkenyl said alkenyl may comprise at least one double bond. $R^a$ is preferably a $C_{12}$-$C_{20}$-alkyl and/or -alkenyl. More preferably $R^a$ is $C_{16}$-$C_{18}$-alkyl and/or -alkenyl. Especially preferred $R^a$ is oleyl and/or cetyl.

In preferred embodiments, m is 2, a mixture of 2 and 3, or a mixture of 2 and 4. In a particularly preferred embodiment, m is 2.

In some embodiments, n is from 2 to 8. Preferably, n is from 2 to 5.

In a very preferred embodiment, the drift control agent further comprises an alkoxylate of the formula (I), wherein $R^a$ is $C_{12}$-$C_{20}$-alkyl and/or -alkenyl, m is 2, a mixture of 2 and 3, or a mixture of 2 and 4, and n is from 2 to 8. In an even more preferred embodiment the drift control agent further comprises an alkoxylate of the formula (I), wherein $R^a$ is $C_{16}$-$C_{18}$-alkyl and/or -alkenyl, m is 2, and n is from 2 to 5.

In an alternative embodiment, the composition does not comprise an alkoxylated fatty alcohol.

In an alternative embodiment, the composition does not comprise an alkoxylated fatty alcohol of formula (I).

It is understood that in some embodiments, the composition according to the present invention may further comprise additional solvents, liquid carriers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, or combinations thereof.

In one embodiment, the the composition according to the present invention does not comprise a fertilizer.

In one preferred embodiment, the composition of the present invention further comprises surfactants. Preferably, the surfactants comprise at least one nonionic surfactant and even more preferably, the surfactant comprises ethoxylated tallow amine.

In a preferred embodiment, the composition according to the present invention comprises between 0 wt. % and about 6 wt. % ethoxylated tallow amine.

In yet another preferred embodiment, the composition according to the present invention further comprises adjuvants.

In some embodiments, the composition according to the present invention comprises at least one anti-foaming agent. Suitable anti-foaming agents comprise silicones and salts of fatty acids, wherein the fatty acids are preferably selected form $C_{12}$-$C_{22}$ fatty acids. Preferably, the anti-foaming agent comprises silicones, preferably polydimethylsiloxane. Preferably, the composition according to the present invention comprises between 0 wt. % and about 1 wt. %, and even more preferably between about 0 wt. % and about 0.1 wt. % of anti-foaming agent, wherein the wt. % are based on the weight of the aqueous composition.

The present invention further relates to a method for preparing a tank mix, which comprises the steps of
  a. providing a composition according to the present invention,
  b. diluting the composition with water;
  c. optional adding of further pesticides.

The further pesticides may be selected from any pesticide or combinations thereof. Even more preferred, additional pesticides are herbicides or combinations thereof, such as amino acid derivatives including bilanafos, glyphosate (e.g. glyphosate free acid, glyphosate ammonium salt, glyphosate isopropylammonium salt, glyphosate trimethylsulfonium salt, glyphosate potassium salt, glyphosate dimethylamine salt), glufosinate, sulfosate; imidazolinones including imazamethabenz, imazamox, imazapic, imazapyr, imazaquin, imazethapyr; and phenoxy acetic acids: clomeprop, 2,4-dichlorophenoxyacetic acid (2,4-D), 2,4-DB, dichlorprop, MCPA, MCPA-thioethyl, MCPB and Mecoprop.

In a particularly preferred embodiment, the further pesticide is selected as glyphosate.

In preferred embodiments, the tank mix may comprise up to about 10 wt. %, preferably up to 5 about wt. %, and in particular up to about 3 wt. % of the of the composition. Usually, the tank mix contains at least 0.5 wt % of the composition.

In preferred embodiments, the tank mix may comprise up to about 3.0 wt. %, preferably up to about 0.5 wt. %, and in particular up to about 0.25 wt. % of the of the drift control agent. Usually, the tank mix contains at least 0.01 wt. % of the drift control agent.

In a preferred embodiment, the tank mix may comprise up to about 1.0 wt. % of the drift control agent.

In preferred embodiments, the compositions according to the invention are suitable as pesticides, particularly as herbicides. They are suitable as such or as an appropriately formulated composition. The compositions according to the invention control vegetation on non-crop areas very efficiently, especially at high rates of application. They may act against pests or undesirable plants such as broad-leafed weeds and grass weeds in crops such as wheat, rice, corn, soybeans and cotton without causing any significant damage to the crop plants. This effect is mainly observed at low rates of application.

In yet another preferred embodiment, plants, seed or soil are treated with an effective amount of the composition according to the present invention, wherein the composition is allowed to act on the pest, and/or the plant to be protected and/or undesired plant and/or the soil and/or their environment.

Furthermore, it has been found that the compositions according to the invention are also suitable for the defoliation and/or desiccation of plant parts, for which crop plants such as cotton, potato, oilseed rape, sunflower, soybean or field beans, in particular cotton, are suitable. In this regard, compositions of the present invention have been found for the desiccation and/or defoliation of plants, processes for preparing these compositions, and methods for desiccating and/or defoliating plants using the compositions according to the invention.

As desiccants, the compositions according to the invention are suitable in particular for desiccating the above-ground parts of crop plants such as potato, oilseed rape, sunflower and soy-bean, but also cereals. This enables the fully mechanical harvesting of these important crop plants.

In some embodiments, the compositions according to the invention are applied to the plants mainly by spraying the leaves. Here, the application can be carried out using, for example, water as carrier by customary spraying techniques using spray liquor amounts of from about 100 to 1000 l/ha (for example from 300 to 400 l/ha). In other embodiments, the compositions according to the present invention may also be applied by the low-volume or the ultra-low-volume method, or in the form of microgranules.

Herbicidal compositions according to the present invention can be applied pre- or post-emergence, or together with the seed of a crop plant. It is also possible to apply the compositions by applying seed, pretreated with a composition of the invention, of a crop plant. If the active compounds are less well tolerated by certain crop plants, application techniques may be used in which the herbicidal compositions are sprayed, with the aid of the spraying equipment, in such a way that as far as possible they do not come into contact with the leaves of the sensitive crop plants, while the active compounds reach the leaves of undesirable plants growing underneath, or the bare soil surface (post-directed, lay-by).

In a further embodiment, the composition according to the invention can be applied by treating seed. The treatment of seed comprises essentially all procedures familiar to the person skilled in the art (seed dressing, seed coating, seed dusting, seed soaking, seed film coating, seed multilayer coating, seed encrusting, seed dripping and seed pelleting) based on the compositions according to the invention. Here, the herbicidal compositions can be applied diluted or undiluted.

The term seed comprises seed of all types, such as, for example, corns, seeds, fruits, tubers, seedlings and similar forms. Here, preferably, the term seed describes corns and seeds.

The seed used can be seed of the useful plants mentioned above, but also the seed of transgenic plants or plants obtained by customary breeding methods.

The rates of application of the active compound are from 0.0001 to 3.0, preferably 0.01 to 1.0 kg/ha of active substance (a.s.), depending on the control target, the season, the target plants and the growth stage. To treat the seed, the compounds I are generally employed in amounts of from 0.001 to 10 kg per 100 kg of seed.

The present invention also relates to a use of at least one fatty alcohol as a drift control agent for reducing the wind drift of a composition comprising a pesticide (e.g. dicamba) and said at least one fatty alcohol. In a preferred embodiment, the at least one fatty alcohol comprises i. from about 80 wt. % to about 98 wt. % oleyl alcohol and preferably from about 85 wt. % to 96 wt. % oleyl alcohol;

ii. from about 1 wt. % to about 15 wt. % cetyl alcohol and preferably from about 1.5 wt. % to about 10 wt. % cetyl alcohol;

iii. from about 0 wt. % to about 4 wt. % myristic alcohol; and preferably from about 0 wt. % to about 2 wt. % myristic alcohol;

iv. from 0 wt. % and 6 wt. % arachidyl alcohol and preferably from 0 wt. % and 3 wt. % arachidyl alcohol, and wherein the wt. % are based on the weight of the drift control agent.

In yet another preferred embodiment, the present invention relates to the use of the combination of at least one fatty alcohol and an akoxylated fatty alcohol for reducing the wind drift of an aqueous composition comprising a pesticide (e.g. dicamba).

Another preferred embodiment is directed to the use of a composition according to the present invention in the treatment of plants, seed or soil.

The present invention offers various advantages: the drift control agent comprising at least one fatty alcohol reduces drift fines and off-target movement of pesticide (e.g. dicamba) applications compared to current available formulations, while maintaining user friendly handling without adversely affecting their pesticidal activity. The compositions according to the present invention produce less driftable fines at a lower adjuvant use rate in the spray tank in comparison to commercial standard applied as a tank mix.

Further advantages of the invention are good adhesion of the pesticide on the surface of the treated plants, increased permeation of the pesticides into the plant and, as a result, more rapid and enhanced activity. An advantage is the low toxicity of the fatty alcohols, in particular the low aquatic toxicity. Another advantage is the low harmful effect against crop plants, i.e., low phytotoxic effects. Another advantage is that the volatility of pesticide compositions (e.g. comprising auxin herbicides like dicamba, or 2,4-D) is reduced; or that no further drift control agent needs to be added to the tank mix, thus allowing an easy and safe preparation of the tank mix.

The preferred embodiments of the invention mentioned herein have to be understood as being preferred either independently from each other or in combination with one another.

As used herein, the term "about" modifying the quantity of an ingredient of the invention employed refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about", the claims include equivalents to the quantities. In one embodiment, the term "about" means within 10% of the reported numerical value, preferably within 5% of the reported numerical value.

As used herein, the term "essentially consists of" or "essentially consisting of" may be understood that an amount of a constituent in a mixture or composition is present in an amount of at least about 50%, preferably at least about 75%, more preferably at least about 90%, and even more preferably at least about 95% of said mixture or composition. If not stated otherwise, the percentages are based on weight.

As used herein, the term "drift control agents" may be understood as referring to chemical agents, which reduce the wind drift when spraying an aqueous tank mix composition. Drift control agents are commercially available from various companies (tradenames of the products given in brackets): Ag Spray, Inc. (Halt), Ashland Specialty Ingredients (Soilcare), Brewer International Inc. (Poly Control 2), Conklin Co. Inc. (Complete), Helena Chemical Co. (AccuQuest WM, AccuZone DC, Grounded, On-Line, Sta Put, Strike Zone, LineMan), Intracrop (Driftless), Kalo, Inc. (One AP XL, Spectra Tank Mix, Spectra Max), Loveland Products, Inc. (LI 700), Nalco Co. (Staput Plus), Precision Laboratories, Inc. (Border, Border Xtra, Direct, Transport Plus), Rhodia Inc. (AgRHO DEP, AgRHO DR), Sanitek Products, Inc. (SANAG Div.) (41-A, 38-F), Willowood USA (Willowood Driftguard), FORMULATORS' TRADE NAMES: Brandt Consolidated, Inc. (Drift Free), Custom Agricultural Formulators (Driftstop), Loveland Products, Inc. (Compadre, Liberate, Reign, Reign LC, Weather Gard Complete), Wilbur-Ellis Co. (Bronc Max EDT, EDT Concentrate, In-Place), Winfield Solutions, LLC (Arrow four, Corral AMS, InterLock, Placement Propak, PowerLock), and various other discontinued commercial products, such as Apasil, Bivert, Chem-Trol, Confine, Corral Poly, Drifgon, Driftgard, Drop Zone, Intac Plus, Nalcotrol, Nalcotrol II, Nalquatic, Progacyl, Target, TMP, and Wind-Fall.

Preferred examples of known drift control agents are lecithin derivatives, linear nonionic polymers with a molecular weight of at least 20 kDa or guar gum.

Suitable lecithin derivatives are lecithin or its chemically modified derivatives. Such drift control agents are for example commercially available as Liberate® or Compadre® from Loveland Products.

Suitable linear nonionic polymers with a molecular weight of at least 20 kDa, may be for example include polyacrylamide, polyacrylate, or a polyethylene glycol. Preferred nonionic polymers are polyacrylamide and polyacrylate. The molecular weight of said nonionic polymers is usually at least 50 kDa, preferably at least 100 kDa, and in particular at least 1000 kDa.

Suitable guar gums are for example described in EP 0 660 999, or are commercially available as AGRHO® DEP 775 or AGRHO® DR 200 from Rhodia.

As used herein, the term "fatty alcohol" refers to a branched or linear ($C_6$-$C_{22}$)alkyl chain exhibiting a terminal hydroxyl group (—OH). The term "fatty alcohol" comprises fully saturated fatty alcohols, or unsaturated fatty alcohols. Examples of saturated fatty alcohols are hexanol, heptanol, octanol, nonanol, decanol, undecanol, lauryl alcohol, tridecyl alcohol, myristic alcohol, pentadecyl alcohol, cetyl alcohol, heptadecyl alcohol, stearyl alcohol, nonadecyl alcohol, arachidyl alcohol heneicosyl alcohol or behenyl alcohol as well as mixtures of the foregoing. Non-limiting examples of unsaturated fatty alcohols are palmitoeyl alcohol, oleyl alcohol and linoleyl alcohol or any mixture of the foregoing. It is noted that the term fatty alcohol does not include fatty alcohol alkoxylates.

As used herein, the term "fatty alcohol alkoxylate" refers to fatty alcohols reacted with alkoxylating agents, such as ethyleneoxide or propyleneoxide. Preferably, fatty alcohol alkoxylates are fatty alcohol ethoxylates, wherein the fatty alcohol may comprise a $C_{6-22}$, preferably a $C_{14-20}$, and in particular a $C_{16-18}$ fatty alcohol carbon backbone moiety. A preferred alkoxylate is ethoxylate. The fatty alcohol ethoxylate may comprise from 1 to 15, preferably from 1 to 8, and in particular from 2 to 6 equivalents of ethylene oxide. Even more preferably, the fatty alcohol ethoxylate is a $C_{14-20}$ fatty alcohol, which comprises from 2 to 6 equivalents of ethylene oxide. Even more preferably, the fatty alcohol alkoxlate has an HLB value of about 4.0 to about 11.0, preferably of about 6.0 to about 10.0 and more preferably of about 8.0 to about 10.0. The HLB may be determined according to Griffin.

As used herein, the term "polyamine" within the meaning of the invention relates to an organic compound comprising at least two amino groups, such as a primary, secondary or tertiary amino group.

As used herein, the term "cationic polyamine" refers to a polyamine, which is present as cation. Preferably, in a cationic polyamine at least one amino group is present in the cationic form of an ammonium, such as R—$N^+H_3$, $R_2$—$N^+H_2$, or $R_3$—$N^+H$. The skilled person is aware which of the amine groups in the cationic polyamine is preferably protonated, because this depends for example on the pH or the physical form. In aqueous solutions the alkalinity of the amino groups of the cationic polyamine increases usually from tertiary amine to primary amine to secondary amine.

As used herein, the term "pesticide" refers to at least one active substance selected from the group consisting of fungicides, insecticides, nematicides, herbicides, safeners and/or growth regulators. Preferred pesticides are herbicides. Mixtures of pesticides of two or more of the abovementioned classes may also be used. The skilled person is familiar with such pesticides, which can be found, for example, in the Pesticide Manual, 15th Ed. (2009), The British Crop Protection Council, London. The following list give examples of pesticides which may be used as pesticide.

Examples for fungicides include, but are not limited to storbilurins, carboxamides, azoles, heterocyclic compounds, carbamates and other active compounds.

Examples for useful strobilurins include, but are not limited to, azoxystrobin, dimoxystrobin, enestroburin, fluoxastrobin, kresoxim-methyl, metominostrobin, orysastrobin, picoxystrobin, pyraclostrobin, pyrametostrobin, pyraoxystrobin, pyribencarb, trifloxystrobin, methyl (2-chloro-5-[1-(3-methylbenzyloxyimino)ethypenzyl]carbamate and 2-(2-(3-(2,6-dichlorophenyl)-1-methyl-allylideneaminooxymethyl)-phenyl)-2-methoxyimino-N-methylacetamide.

Examples for useful carboxamides include, but are not limited to carboxanilides including benalaxyl, benalaxyl-M, benodanil, bixafen, boscalid, carboxin, fenfuram, fenhexamid, flutolanil, furametpyr, isopyrazam, isotianil, kiralaxyl, mepronil, metalaxyl, metalaxyl-M (mefenoxam), ofurace, oxadixyl, oxycarboxin, penflufen, penthiopyrad, sedaxane, tecloftalam, thifluzamide, tiadinil, 2-amino-4-methyl-thiazole-5-carboxanilide, N-(3',4',5'-trifluorobiphenyl-2-yl)-3-difluoromethyl-1-methyl-1H-pyrazole-4-carboxamide, N-(4'-trifluoromethylthiobiphenyl-2-yl)-3-difluoromethyl-1-methyl-1H-pyrazole-4-carboxamide and N-(2-(1,3,3-trimethyl-butyl)-phenyl)-1,3-dimethyl-5-fluoro-1H-pyrazole-4-carboxamide; carboxylic morpholides including dimethomorph, flumorph, pyrimorph; benzoic acid amides including flumetover, fluopicolide, fluopyram, zoxamide; and other carboxamides including carpropamid, dicyclomet, mandiproamid, oxytetracyclin, silthiofarm and N-(6-methoxy-pyridin-3-yl) cyclopropanecarboxylic acid amide.

Examples for useful azoles include, but are not limited to, triazoles including azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole; imidazoles including cyazofamid, imazalil, pefurazoate, prochloraz, triflumizol; benzimidazoles including benomyl, carbendazim, fuberidazole, thiabendazole; and others azoles including ethaboxam, etridiazole, hymexazole and 2-(4-chloro-phenyl)-N-[4-(3,4-dimethoxy-phenyl)-isoxazol-5-yl]-2-prop-2-ynyloxy-acetamide.

Examples for useful heterocyclic compounds include, but are not limited to, pyridines including fluazinam, pyrifenox, 3-[5-(4-chloro-phenyl)-2,3-dimethyl-isoxazolidin-3-yl]-pyridine, 3-[5-(4-methyl-phenyl)-2,3-dimethyl-isoxazolidin-3-yl]-pyridine; pyrimidines including bupirimate, cyprodinil, diflumetorim, fenarimol, ferimzone, mepanipyrim, nitrapyrin, nuarimol, pyrimethanil; Piperazines including triforine; pyrroles including fenpiclonil, fludioxonil; morpholines including aldimorph, dodemorph, dodemorph-acetate, fenpropimorph, tridemorph; piperidines including fenpropidin; dicarboximides including fluoroimid, iprodione, procymidone, vinclozolin; non-aromatic 5-membered heterocycles including famoxadone, fenamidone, flutianil, octhilinone, probenazole, 5-amino-2-isopropyl-3-oxo-4-ortho-tolyl-2,3-dihydro-pyrazole-1-carbothioic acid S-allyl ester; and other heterocyclic compounds including acibenzolar-S-methyl, ametoctradin, amisulbrom, anilazin, blasticidin-S, captafol, captan, chinomethionat, dazomet, debacarb, diclomezine, difenzoquat, difenzoquat-methylsulfate, fenoxanil, Folpet, oxolinic acid, piperalin, proquinazid, pyroquilon, quinoxyfen, triazoxide, tricyclazole, 2-butoxy-6-iodo-3-propylchromen-4-one, 5-chloro-1-(4,6-dimethoxy-pyrimidin-2-yl)-2-methyl-1H-benzoimidazole and 5-chloro-7-(4-methylpiperidin-1-yl)-6-(2,4,6-trifluorophenyl)-[1,2,4]triazolo[1,5-a]pyrimidine.

Examples for useful carbamates include, but are not limited to, thio- and dithiocarbamates including ferbam, mancozeb, maneb, metam, methasulphocarb, metiram, propineb, thiram, zineb, ziram; other carbamates including benthiavalicarb, diethofencarb, iprovalicarb, propamocarb, propamocarb hydrochlorid, valifenalate and N-(1-(1-(4-cyano-phenyl)ethanesulfonyl)-but-2-yl) carbamic acid-(4-fluorophenyl) ester.

Examples for useful other active substances include, but are not limited to, guanidines including guanidine, dodine, dodine free base, guazatine, guazatine-acetate, iminoctadine, iminoctadine-triacetate, iminoctadine-tris(albesilate); antibiotics including kasugamycin, kasugamycin hydrochloride-hydrate, streptomycin, polyoxine, validamycin A; nitrophenyl derivates including binapacryl, dinobuton, dinocap, nitrthal-isopropyl, tecnazen; organometal compounds including fentin salts, such as fentin-acetate, fentin chloride or fentin hydroxide; sulfur-containing heterocyclyl compounds including dithianon, isoprothiolane; organophosphorus compounds including edifenphos, fosetyl, fosetyl-aluminum, iprobenfos, phosphorous acid and its salts, pyrazophos, tolclofos-methyl; organochlorine compounds including chlorothalonil, dichlofluanid, dichlorophen, flusulfamide, hexachlorobenzene, pencycuron, pentachlorphenole and its salts, phthalide, quintozene, thiophanate-methyl, tolylfluanid, N-(4-chloro-2-nitro-phenyl)-N-ethyl-4-methyl-benzenesulfonamide; inorganic active substances including Bordeaux mixture, copper acetate, copper hydroxide, copper oxychloride, basic copper sulfate, sulfur; and other active substances including biphenyl, bronopol, cyflufenamid, cymoxanil, diphenylamin, metrafenone, mildiomycin, oxincopper, prohexadione-calcium, spiroxamine, tebufloquin, tolylfluanid, N-(cyclo-propylmethoxyimino-(6-difluoro-methoxy-2,3-difluoro-phenyl)-methyl)-2-phenyl acetamide, N'-(4-(4-chloro-3-trifluoronnethyl-phenoxy)-2,5-dimethyl-phenyl)-N-ethyl-N-methyl formamidine, N'-(4-(4-fluoro-3-trifluoronnethyl-phenoxy)-2,5-dimethyl-phenyl)-N-ethyl-N-methyl formamidine, N'-(2-methyl-5-trifluoromethyl-4-(3-trinnethylsilanyl-propoxy)-phenyl)-N-ethyl-N-methyl formamidine, N'-(5-difluoromethyl-2-methyl-4-(3-trimethylsilanyl-propoxy)-phenyl)-N-ethyl-N-methyl formamidine, 2-{1-[2-(5-methyl-3-trifluoromethyl-pyrazole-1-yl)-acetyl]-piperidin-4-yl)}-thiazole-4-carboxylic acid methyl-(1,2,3,4-tetrahydro-naphthalen-1-yl)-amide, 2-{1-[2-(5-methyl-3-trifluoromethyl-pyrazole-1-yl)-acetyl]-piperidin-4-yl}-thiazole-4-carboxylic acid methyl-(R)-1,2,3,4-tetrahydro-naphthalen-1-yl-amide, methoxy-acetic acid 6-tert-butyl-8-fluoro-2,3-dimethyl-quinolin-4-yl ester and N-Methyl-2-{1-[(5-methyl-3-trifluoromethyl-1H-pyrazol-1-yl)-acetyl]-piperidin-4-yl}-N-[(1R)-1,2,3,4-tetrahydronaphthalen-1-yl]-4-thiazolecarboxamide.

Examples for useful growth regulators include, but are not limited to, abscisic acid, amidochlor, ancymidol, 6-benzylaminopurine, brassinolide, butralin, chlormequat (chlormequat chloride), choline chloride, cyclanilide, daminozide, dikegulac, dimethipin, 2,6-dimethylpuridine, ethephon, flumetralin, flurprimidol, fluthiacet, forchlorfenuron, gibberellic acid, inabenfide, indole-3-acetic acid, maleic hydrazide, mefluidide, mepiquat (mepiquat chloride), naphthaleneacetic acid, N-6-benzyladenine, paclobutrazol, prohexadione (prohexadione-calcium), prohydrojasmon, thidiazuron, triapenthenol, tributyl phosphorotrithioate, 2,3,5-tri-iodobenzoic acid, trinexapac-ethyl and uniconazole.

Examples for useful herbicides include, but are not limited to, acetamides including acetochlor, alachlor, butachlor, dimethachlor, dimethenamid, flufenacet, mefenacet, metolachlor, metazachlor, napropamide, naproanilide, pethoxamid, pretilachlor, propachlor, thenylchlor; amino acid derivatives including bilanafos, glyphosate (e.g. glyphosate free acid, glyphosate ammonium salt, glyphosate isopropylammonium salt, glyphosate trimethylsulfonium salt, glyphosate potassium salt, glyphosate dimethylamine salt), glufosinate, sulfosate; aryloxyphenoxypropionates including clodinafop, cyhalofop-butyl, fenoxaprop, fluazifop, haloxyfop, metamifop, propaquizafop, quizalofop, quizalofop-P-tefuryl; bipyridyls including diquat, paraquat; (thio)carbamates including asulam, butylate, carbetamide, desmedipham, dimepiperate, eptam (EPTC), esprocarb, molinate, orbencarb, phenmedipham, prosulfocarb, pyributicarb, thiobencarb, triallate; cyclohexanediones including butroxydim, clethodim, cycloxydim, profoxydim, sethoxydim, tepraloxydim, tralkoxydim; dinitroanilines including benfluralin, ethalfluralin, oryzalin, pendimethalin, prodiamine, trifluralin; diphenyl ethers including acifluorfen, aclonifen, bifenox, diclofop, ethoxyfen, fomesafen, lactofen, oxyfluorfen; hydroxybenzonitriles including bomoxynil, dichlobenil, ioxynil; imidazolinones including imazamethabenz, imazamox, imazapic, imazapyr, imazaquin, imazethapyr; phenoxy acetic acids including clomeprop, 2,4-dichlorophenoxyacetic acid (2,4-D), 2,4-DB, dichlorprop, MCPA, MCPA-thioethyl, MCPB, Mecoprop; pyrazines including chloridazon, flufenpyr-ethyl, fluthiacet, norflurazon, pyridate; pyridines including aminopyralid, clopyralid, diflufenican, dithiopyr, fluridone, fluroxypyr, picloram, picolinafen, thiazopyr; sulfonyl ureas including amidosulfuron, azimsulfuron, bensulfuron, chlorimuron-ethyl, chlorsulfuron, cinosulfuron, cyclosulfamuron, ethoxysulfuron, flazasulfuron, flucetosulfuron, flupyrsulfuron, foramsulfuron, halosulfuron, imazasulfuron, iodosulfuron, mesosulfuron, metazosulfuron, metsulfuron-methyl, nicosulfuron, oxasulfuron, primisulfuron, prosulfuron, pyrazosulfuron, rimsulfuron, sulfometuron, sulfosulfuron, thifensulfuron, triasulfuron, tribenuron, trifloxysulfuron, triflusulfuron, tritosulfuron, 1-((2-chloro-6-propyl-imidazo[1,2-b]pyridazin-3-yl)sulfonyl)-3-(4,6-dimethoxy-pyrimidin-2-yl)urea; triazines including ametryn, atrazine, cyanazine, dimethametryn, ethiozin, hexazinone, metamitron, metribuzin, prometryn, simazine, terbuthylazine, terbutryn, triaziflam; ureas including chlorotoluron, daimuron, diuron, fluometuron, isoproturon, linuron, methabenzthiazuron, tebuthiuron; other acetolactate synthase inhibitors including bispyribac-sodium, cloransulam-methyl, diclosulam, florasulam, flucarbazone, flumetsulam, metosulam, ortho-sulfamuron, penoxsulam, propoxycarbazone, pyribambenz-propyl, pyribenzoxim, pyriftalid, pyriminobac-methyl, pyrimisulfan, pyrithiobac, pyroxasulfone, pyroxsulam; and others including amicarbazone, aminotriazole, anilofos, beflubutamid, benazolin, bencarbazone, benfluresate, benzofenap, bentazone, benzobicyclon, bicyclopyrone, bromacil, bromobutide, butafenacil, butamifos, cafenstrole, carfentrazone, cinidon-ethlyl, chlorthal, cinmethylin, clomazone, cumyluron, cyprosulfamide, dicamba, difenzoquat, diflufenzopyr, *Drechslera monoceras*, endothal, ethofumesate, etobenzanid, fenoxasulfone, fentrazamide, flumiclorac-pentyl, flumioxazin, flupoxam, flurochloridone, flurtamone, indanofan, isoxaben, isoxaflutole, lenacil, propanil, propyzamide, quinclorac, quinmerac, mesotrione, methyl arsonic acid, naptalam, oxadiargyl, oxadiazon, oxaziclomefone, pentoxazone, pinoxaden, pyraclonil, pyraflufen-ethyl, pyrasulfotole, pyrazoxyfen, pyrazolynate, quinoclamine, saflufenacil, sulcotrione, sulfentrazone, terbacil, tefuryltrione, tembotrione, thiencarbazone, topramezone, (3-[2-chloro-4-fluoro-5-(3-methyl-2,6-dioxo-4-trifluoromethyl-3,6-dihydro-2H-pyrimidin-1-yl)-phenoxy]-pyridin-2-yloxy)-acetic acid ethyl ester, 6-amino-5-chloro-2-cyclopropyl-pyrimidine-4-carboxylic acid methyl ester, 6-chloro-3-(2-cyclopropyl-6-methyl-phenoxy)-pyridazin-4-ol, 4-amino-3-chloro-6-(4-chloro-phenyl)-5-fluoro-pyridine-2-carboxylic acid, 4-amino-3-chloro-6-(4-chloro-2-fluoro-3-methoxy-phenyl)-pyridine-2-carboxylic acid methyl ester, and 4-amino-3-chloro-6-(4-chloro-3-dimethylamino-2-fluoro-phenyl)-pyridine-2-carboxylic acid methyl ester.

Examples for useful insecticides include, but are not limited to, organo(thio)phosphates including acephate, azamethiphos, azinphos-methyl, chlorpyrifos, chlorpyrifos-methyl, chlorfen-vinphos, diazinon, dichlorvos, dicrotophos, dimethoate, disulfoton, ethion, fenitrothion, fenthion, isoxathion, malathion, methamidophos, methidathion, methyl-parathion, mevinphos, monocrotophos, oxydemeton-methyl, paraoxon, parathion, phenthoate, phosalone, phosmet, phosphamidon, phorate, phoxim, pirimiphos-methyl, profenofos, prothiofos, sulprophos, tetrachlor-vinphos, terbufos, triazophos, trichlorfon; carbamates including alanycarb, aldicarb, bendiocarb, benfuracarb, carbaryl, carbofuran, carbosulfan, fenoxycarb, furathiocarb, methiocarb, methomyl, oxamyl, pirimicarb, propoxur, thiodicarb, triazamate; pyrethroids including allethrin, bifenthrin, cyfluthrin, cyhalothrin, cyphenothrin, cypermethrin, alpha-cypermethrin, beta-cypermethrin, zeta-cypermethrin, deltamethrin, esfenvalerate, etofenprox, fenpropathrin, fenvalerate, imiprothrin, lambda-cyhalothrin, permethrin, prallethrin, pyrethrin I and II, resmethrin, silafluofen, taufluvalinate, tefluthrin, tetramethrin, tralomethrin, transfluthrin, profluthrin, dimefluthrin; insect growth regulators including chitin synthesis inhibitors such as benzoylureas, chlorfluazuron, cyramazin, diflubenzuron, flucycloxuron, flufenoxuron, hexaflumuron, lufenuron, novaluron, teflubenzuron, triflumuron; buprofezin, diofenolan, hexythiazox, etoxazole, clofentazine; ecdysone antagonists such as halofenozide, methoxyfenozide, tebufenozide, azadirachtin; and juvenoids such as pyriproxyfen, methoprene, fenoxycarb; d) lipid biosynthesis inhibitors: spirodiclofen, spiromesifen, spirotetramat; nicotinic receptor agonists/antagonists compounds including clothianidin, dinotefuran, imidacloprid, thiamethoxam, nitenpyram, acetamiprid, thiacloprid, 1-(2-chlorothiazol-5-ylmethyl)-2-nitrimino-3,5-dimethyl-[1,3,5]triazinane; GABA antagonist compounds including endosulfan, ethiprole, fipronil, vaniliprole, pyrafluprole, pyriprole, 5-amino-1-(2,6-dichloro-4-methyl-phenyl)-4-sulfinamoyl-1H-pyrazole-3-carbothioic acid amide; macrocyclic lactone insecticides including abamectin, emamectin, milbemectin, lepimectin, spinosad, spinetoram; mitochondrial electron transport inhibitor (METI) I acaricides including fenazaquin, pyridaben, tebufenpyrad, tolfenpyrad, flufenerim; METI II and III compounds including acequinocyl, fluacyprim, hydramethylnon; uncouplers including chlorfenapyr; oxidative phosphorylation inhibitors including cyhexatin, diafenthiuron, fenbutatin oxide, propargite; moulting disruptor compounds including cryomazine; mixed function oxidase inhibitors including piperonyl butoxide; sodium channel blockers including indoxacarb and metaflumizone; and other insecticides including benclothiaz, bifenazate, cartap, flonicamid, pyridalyl, pymetrozine, sulfur, thiocyclam, flubendiamide, chlorantraniliprole, cyazypyr (HGW86), cyenopyrafen, flupyrazofos, cyflumetofen, amidoflumet, imicyafos, bistrifluron, and pyrifluquinazon.

As used herein, the term "pest" refers to, but is not limited to, a plant or animal or other organism or virus detrimental to humans or human concerns such as agriculture or livestock production. The term pest may include insects, mites, parasides, nematodes, gastropods and plant pathogens. Examples of pest insects are Ants, cockroaches, flies and wasps, aphids, larvae, grasshoppers, crickets, lice, fleas, mosquitoes, tsetse flies, termites, woodworm and wood ants, bookworms, carpet beetles and clothes and gypsy moths. Examples of nematodes are root-knot nematode, soybean cyst nematode and potato cyst nematode. Examples of parasides are chiggers and *Sarcoptes scabiei*. Examples of gastropodes include *Deroceras reticulatum, Deroceras* spp., *Milax* spp., *Tandonia* sp., *Limax* spp., *Arion* spp., *Veronicella sloanei Helix aspersa, Cernuella virgata, Theba pisana* and *Cochlicella* spp., *Achatina fulica, Succinea costaricana, Ovachlamys fulgens, Amphibulima patula dominicensis, Zachrysia provisoria, Bradybaena similaris, Pomacea canaliculata, Bulinus* sp., *Biomphalaria* spp. and *Oncomelania*. Plant pathogens include bacteria involved in plant diseases, fungi involved in plant diseases and viruses involved in diseases of plants.

As used herein, the term "plant" comprises crop plants. Examples of suitable crops are, but not limited to, *Allium cepa, Ananas comosus, Arachis hypogaea, Asparagus officinalis, Avena sativa, Beta vulgaris* spec. *altissima, Beta vulgaris* spec. *rapa, Brassica napus* var. *napus, Brassica napus* var. *napobrassica, Brassica rapa* var. *silvestris, Brassica oleracea, Brassica nigra, Brassica juncea, Brassica campestris, Camellia sinensis, Carthamus tinctorius, Carya illinoinensis, Citrus limon, Citrus sinensis, Coffea arabica* (*Coffea canephora, Coffea liberica*), *Cucumis sativus, Cynodon dactylon, Daucus carota, Elaeis guineensis, Fragaria vesca, Glycine max, Gossypium hirsutum,* (*Gossypium arboreum, Gossypium herbaceum, Gossypium vitifolium*), *Helianthus annuus, Hevea brasiliensis, Hordeum vulgare, Humulus lupulus, Ipomoea batatas, Juglans regia, Lens culinaris, Linum usitatissimum, Lycopersicon lycopersicum, Malus* spec., *Manihot esculenta, Medicago sativa, Musa* spec., *Nicotiana tabacum* (*N. rustica*), *Olea europaea,*

*Oryza sativa, Phaseolus lunatus, Phaseolus vulgaris, Picea abies, Pinus* spec., *Pistacia vera, Pisum sativum, Prunus avium, Prunus persica, Pyrus communis, Prunus armeniaca, Prunus cerasus, Prunus dulcis* and *prunus domestica, Ribes sylvestre, Ricinus communis, Saccharum officinarum, Secale cereale, Sinapis alba, Solanum tuberosum, Sorghum bicolor* (*S. vulgare*), *Theobroma cacao, Trifolium pratense, Triticum aestivum, Triticale, Triticum durum, Vicia faba, Vitis vinifera, Zea mays*. Preferred crops are *Arachis hypogaea, Beta vulgaris* spec. *altissima, Brassica napus* var. *napus, Brassica oleracea, Brassica juncea, Citrus limon, Citrus sinensis, Coffea arabica* (*Coffea canephora, Coffea liberica*), *Cynodon dactylon, Glycine max, Gossypium hirsutum,* (*Gossypium arboreum, Gossypium herbaceum, Gossypium vitifolium*), *Helianthus annuus, Hordeum vulgare, Juglans regia, Lens culinaris, Linum usitatis-simum, Lycopersicon lycopersicum, Malus* spec., *Medicago sativa, Nicotiana tabacum* (*N. rustica*), *Olea europaea, Oryza sativa, Phaseolus lunatus, Phaseolus vulgaris, Pistacia vera, Pisum sativum, Prunus dulcis, Saccharum officinarum, Secale cereale, Solanum tuberosum, Sorghum bicolor* (*S. vulgare*), *Triticale, Triticum aestivum, Triticum durum, Vicia faba, Vitis vinifera* and *Zea mays*.

Furthermore, the term plant also covers genetically modified plants. The term "genetically modified plants" is to be understood as plants, which genetic material has been modified by the use of recombinant DNA techniques in a way that under natural circumstances it cannot readily be obtained by cross breeding, mutations, natural recombination, breeding, mutagenesis, or genetic engineering. Typically, one or more genes have been integrated into the genetic material of a genetically modified plant in order to improve certain properties of the plant. Such genetic modifications also include, but are not limited to, targeted post-transtional modification of protein(s), oligo- or polypeptides e. g. by glycosylation or polymer additions such as prenylated, acetylated or farnesylated moieties or PEG moieties. The term "plants" also includes plants that have been modified by breeding, mutagenesis or genetic engineering, e.g. have been rendered tolerant to applications of specific classes of herbicides. Tolerance to classes of herbicides has been developed such as auxin herbicides such as dicamba or 2,4-D; bleacher herbicides such as hydroxyphenylpyruvate dioxygenase (HPPD) inhibitors or phytoene desaturase (PDS) inhibitors; acetolactate synthase (ALS) inhibitors such as sulfonyl ureas or imidazolinones; enolpyruvyl shikimate 3-phosphate synthase (EPSP) inhibitors such as glyphosate; glutamine synthetase (GS) inhibitors such as glufosinate; protoporphyrinogen-IX oxidase (PPO) inhibitors; lipid biosynthesis inhibitors such as acetyl CoA carboxylase (ACCase) inhibitors; or oxynil (i. e. bromoxynil or ioxynil) herbicides as a result of conventional methods of breeding or genetic engineering. Furthermore, plants have been made resistant to multiple classes of herbicides through multiple genetic modifications, such as resistance to both glyphosate and glufosinate or to both glyphosate and a herbicide from another class such as ALS inhibitors, HPPD inhibitors, auxin herbicides, or ACCase inhibitors. These herbicide resistance technologies are, for example, described in Pest Management Science 61, 2005, 246; 61, 2005, 258; 61, 2005, 277; 61, 2005, 269; 61, 2005, 286; 64, 2008, 326; 64, 2008, 332; Weed Science 57, 2009, 108; Australian Journal of Agricultural Research 58, 2007, 708; Science 316, 2007, 1185; and references quoted therein. Examples of these herbicide resistance technologies are also described in US 2008/0028482, US2009/0029891, WO 2007/143690, WO 2010/080829, U.S. Pat. Nos. 6,307,129, 7,022,896, US 2008/0015110, U.S. Pat. Nos. 7,632,985, 7,105,724, and 7,381,861, each herein incorporated by reference. Several cultivated plants have been rendered tolerant to herbicides by conventional methods of breeding (mutagenesis), e. g. Clearfield® summer rape (Canola, BASF SE, Germany) being tolerant to imidazolinones, e. g. imazamox, or ExpressSun® sunflowers (DuPont, USA) being tolerant to sulfonyl ureas, e. g. tribenuron. Genetic engineering methods have been used to render cultivated plants such as soybean, cotton, corn, beets and rape, tolerant to herbicides such as glyphosate, dicamba, imidazolinones and glufosinate, some of which are under development or commercially available under the brands or trade names RoundupReady® (glyphosate tolerant, Monsanto, USA), Cultivance® (imidazolinone tolerant, BASF SE, Germany) and LibertyLink® (glufosinate tolerant, Bayer CropScience, Germany).

Furthermore, plants are also covered that are by the use of recombinant DNA techniques capable to synthesize one or more insecticidal proteins, especially those known from the bacterial genus Bacillus, particularly from Bacillus thuringiensis, such as ä-endotoxins, e. g. CryIA(b), CryIA(c), CryIF, CryIF(a2), CryIIA(b), CryIIIA, CryIIIB(b1) or Cry9c; vegetative insecticidal proteins (VIP), e. g. VIP1, VIP2, VIP3 or VIP3A; insecticidal proteins of bacteria colonizing nematodes, e. g. *Photorhabdus* spp. or *Xenorhabdus* spp.; toxins produced by animals, such as scorpion toxins, arachnid toxins, wasp toxins, or other insect-specific neurotoxins; toxins produced by fungi, such Streptomycetes toxins, plant lectins, such as pea or barley lectins; agglutinins; proteinase inhibitors, such as trypsin inhibitors, serine protease inhibitors, patatin, cystatin or papain inhibitors; ribosome-inactivating proteins (RIP), such as ricin, maize-RIP, abrin, luffin, saporin or bryodin; steroid metabolism enzymes, such as 3-hydroxy-steroid oxidase, ecdysteroid-IDP-glycosyl-transferase, cholesterol oxidases, ecdysone inhibitors or HMG-CoA-reductase; ion channel blockers, such as blockers of sodium or calcium channels; juvenile hormone esterase; diuretic hormone receptors (helicokinin receptors); stilben synthase, bibenzyl synthase, chitinases or glucanases. In the context of the present invention these insecticidal proteins or toxins are to be understood expressly also as pre-toxins, hybrid proteins, truncated or otherwise modified proteins. Hybrid proteins are characterized by a new combination of protein domains, (see, e. g. WO 02/015701). Further examples of such toxins or genetically modified plants capable of synthesizing such toxins are disclosed, e. g., in EP-A 374 753, WO 93/007278, WO 95/34656, EP-A 427 529, EP-A 451 878, WO 03/18810 and WO 03/52073. The methods for producing such genetically modified plants are generally known to the person skilled in the art and are described, e. g. in the publications mentioned above. These insecticidal proteins contained in the genetically modified plants impart to the plants producing these proteins tolerance to harmful pests from all taxonomic groups of athropods, especially to beetles (Coeloptera), two-winged insects (Diptera), and moths (Lepidoptera) and to nematodes (Nematoda). Genetically modified plants capable to synthesize one or more insecticidal proteins are, e. g., described in the publications mentioned above, and some of which are commercially available such as YieldGard® (corn cultivars producing the Cry1Ab toxin), YieldGard® Plus (corn cultivars producing Cry1Ab and Cry3Bb1 toxins), Starlink® (corn cultivars producing the Cry9c toxin), Her-Culex® RW (corn cultivars producing Cry34Ab1, Cry35Ab1 and the enzyme Phosphinothricin-N-Acetyltransferase [PAT]); NuCOTN® 33B (cotton cultivars producing the Cry1Ac toxin), Bollgard® I (cotton cultivars producing the Cry1Ac toxin), Bollgard® II (cotton cultivars producing Cry1Ac and Cry2Ab2 toxins); VIPCOT® (cotton cultivars producing a VIP-toxin); New-Leaf® (potato cultivars producing the Cry3A toxin); Bt-Xtra®, NatureGard®, KnockOut®, Bite-Gard®, Protecta®, Bt11 (e. g. Agrisure® CB) and Bt176 from Syngenta Seeds SAS, France, (corn cultivars producing the Cry1Ab toxin and PAT enyzme), MIR604 from Syngenta Seeds SAS, France (corn cultivars producing a modified version of the Cry3A toxin, c.f. WO 03/018810), MON 863 from Monsanto Europe S.A., Belgium (corn cultivars producing the Cry3Bb1 toxin), IPC 531 from Monsanto Europe S.A., Belgium (cotton cultivars producing a modified version of the Cry1Ac toxin) and 1507 from Pioneer Overseas Corporation, Belgium (corn cultivars producing the Cry1F toxin and PAT enzyme).

Furthermore, the term plants also covers plants derived from the use of recombinant DNA techniques capable to synthesize one or more proteins to increase the resistance or tolerance of those plants to bacterial, viral or fungal pathogens. Examples of such proteins are the so-called "pathogenesis-related proteins" (PR proteins, see, e.g. EP-A 392 225), plant disease resistance genes (e. g. potato cultivars, which express resistance genes acting against Phytophthora infestans derived from the mexican wild potato *Solanum bulbocastanum*) or T4-lysozym (e.g. potato cultivars capable of synthesizing these proteins with increased resistance against bacteria such as Erwinia amylvora). The methods for producing such genetically modified plants are generally known to the person skilled in the art and are described, e.g. in the publications mentioned above.

Furthermore, the term plants also includes plants created by the use of recombinant DNA techniques which are capable to synthesize one or more proteins to increase the productivity (e.g. bio mass production, grain yield, starch content, oil content or protein content), tolerance to drought, salinity or other growth-limiting environmental factors or tolerance to pests and fungal, bacterial or viral pathogens of those plants.

Furthermore, the term plants also includes plants that contain by the use of recombinant DNA techniques a modified amount of substances of content or new substances of content, specifically to improve human or animal nutrition, e. g. oil crops that produce health-promoting long-chain omega-3 fatty acids or unsaturated omega-9 fatty acids (e. g. Nexera® rape, DOW Agro Sciences, Canada).

Furthermore, plants are also covered that contain by the use of recombinant DNA techniques a modified amount of substances of content or new substances of content, specifically to improve raw material production, e.g. potatoes that produce increased amounts of amylopectin (e.g. Am-Flora® potato, BASF SE, Germany).

As used herein, suitable "solvents" and "liquid carriers" comprise organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahy-dronaphtha-lene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

As used herein, the term surfactants comprises surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

As used herein, the term "anionic surfactants" comprise alkali, alkaline earth or ammonium salts of sulfonates, sulfates, phosphates, carboxylates, and mixtures thereof. Examples of sulfonates are alkylarylsulfonates, diphenyl-sulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

As used herein, the term "nonionic surfactants" comprise alkoxylates, N-subsituted fatty acid amides, amine oxides, esters, sugar-based surfactants, polymeric surfactants, and mixtures thereof. Examples of alkoxylates are compounds such as alcohols, alkylphenols, amines, tallow amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-sub-sititued fatty acid amides are fatty acid glucamides or fatty acid alkanolamides. Examples of esters are fatty acid esters, glycerol esters or mono-glycerides. Examples of sugar-based surfactants are sorbitans, ethoxylated sorbitans, sucrose and glucose esters or alkylpolyglucosides. Examples of polymeric surfactants are homo- or co-polymers of vinylpyrrolidone, vinylalcohols, or vinylacetate. The alkoxylate of the formula (I) is not a nonionic surfactant within the meaning of this invention.

As used herein, the term "cationic surfactants" comprises quaternary surfactants, for example quaternary ammonium compounds with one or two hydrophobic groups, or salts of long-chain primary amines. Suitable amphoteric surfactants are alkylbetaines and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

As used herein, the term "adjuvants" are compounds, which have a negligible or even no pesticidal activity themselves, and which improve the biological performance of the active compound on the target. Examples are surfactants, mineral or vegetable oils, and other auxilaries. Further examples are listed by Knowles, Adjuvants and additives, Agrow Reports DS256, T&F Informa UK, 2006, chapter 5.

As used herein, the term "thickeners" comprises polysaccharides (e.g. xanthan gum, carboxymethylcellulose), anorganic clays (organically modified or unmodified), polycarboxylates, and silicates.

As used herein, the term "bactericides" comprises bronopol and isothiazolinone derivatives such as alkylisothiazolinones and benzisothiazolinones.

As used herein, the term "anti-freezing agents" comprises ethylene glycol, propylene glycol, urea and glycerin.

As used herein, the term "colorants" (e.g. in red, blue, or green) comprises pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

As used herein, the term "salt" refers to, but is not limited to, any chemical compound formed from the reaction of an acid with a base, with all or part of the hydrogen of the acid replaced by a metal or any other cation. Non-limiting examples of salts, particularly dicamba salts, are sodium, dimethylamine, diglyclolamine or polyamine salts.

As used herein, the term "acid equivalent" refers to the acid portion of an active ingredient. Acid equivalent may thus be defined as that portion of a formulation that theoretically could be converted back to the corresponding or parent acid. For example, the acid equivalent of a dicamba BAPMA salt solution only refers to the concentration (e.g. in g/l) of the dicamba portion.

As used herein, the term "homogeneous" or "homogeneous mixture" refers to a mixture wherein the components that make up the mixture are uniformly distributed throughout the mixture.

As used herein, the term "driftable fines" refers to spray fines, which are small mist type spray particles that may easily move in the wind and thus may drift off-target. Spray fines are spray particles typically defined as spray droplets that are less than 150 μm in diameter. The size of spray droplets may, for example, be determined by Laser diffraction methods.

The invention is further illustrated but not limited by the following examples.

Example 1

Mixing of Formulation 1

Solution A: An aqueous solution containing 600 g/l ae of dicamba acid, N,N-Bis-(3-aminopropyl)methylamine (BAPMA) salt.

Solution B: 10 wt. % solution of Polydimethylsiloxane antifoam emulsion SAG1572 of Momentive Performance Materials Inc.

Antidrift A: mixture of oleyl alcohol (87 wt. % to 95 wt. %), cetyl alcohol (2 wt. % to 10 wt. %), myristic alcohol (less than 2 wt. %) and arachidyl alcohol (less than 3 wt. %). Such a mixture is, for example, commercially available as Agnique® FOH 90C from BASF.

Formulation 1 provided the composition as shown below in Table 1 and it was prepared by adding water to the appropriate amount of Solution A and subsequent addition of Antidrift A and Solution B. Formulation 1 provided a concentration of 480 ae dicamba BAPMA and 160 g/l Antidrift A.

TABLE 1

| Formulation 1 | |
| --- | --- |
| Component | Concentration (wt. %) |
| Solution A | 84.00 |
| Antidrift A | 13.51 |
| Solution B | 0.50 |
| Water (deionized) | 1.99 |

Example 2

Composition of Formulation 2

Formulation 2 is a formulation, wherein the formulation comprises ethoxylated tallow amine Trymeen 6607. The composition of Formulation 2 is shown below in Table 2.

TABLE 2

| Formulation 2 | | |
| --- | --- | --- |
| Component | Concentration (g/l) | Concentration (wt %) |
| Dicamba Acid (100%) | 480 | 40.85 |
| BAPMA | 123 | 10.47 |
| Antidrift A | 127 | 10.80 |
| SAG 1572 | 0.6 | 0.05 |
| Trymeen 6607 | 32 | 2.70 |
| Water | | Ad to 100% |

Example 3

Sprayable Tank Mix

A sprayable tank mix was prepared by mixing 84.0 ml Roundup WetherMax® from Monsanto (aqueous soluble liquid (SL) formulation containing 49 wt % potassium glyphosate), 47.2 ml of Formulation 1, and 3.67 l of water.

As a reference sprayable tank mix ("reference") (i.e. without a drift control agent), 84.0 ml Roundup WetherMax® from Monsanto was mixed with 37.6 ml of Solution A and 3.68 l water.

The spray solutions were sprayed at 40 psi through a TeeJet XR11004 (XR) or AIXR11004 (AIXR) spray nozzle at field dilution rate of 10 gallons per acre (GPA). A laser diffraction setup (SprayTec, Malvern Instruments, 750 mm lens) was used to measure the volume fraction of droplets less than 150 μm in diameter. The laser was positioned perpendicular to the plane of the liquid sheet produced by the spray nozzle. The spray sheet was moved through the laser beam at a constant speed of 4.5 cm/s to enable measurements covering the complete width of the spray pattern at a distance of 10 inch (25.4 cm) below the nozzle tip. The cabinet in which the experiment was carried out was ventilated at the bottom resulting in a downward air flow of 5.5 km/h. Each sample was passed through the laser three times. Before each pass a new background was collected. The data from the three passes was averaged.

The amount of spray drift is influenced by the amount of fine particles from the spray nozzle tip. Typically, spray particles of less than 150 μm in size have a significantly higher potential to remain in the air and to be more affected by wind and to be carried off-site.

The sprayable tank mix containing Formulation 1 produced significantly less fines<150 μm than the reference using the TeeJet XR11004 and AIXR11004 spray nozzle as shown in Table 3.

TABLE 3

| | % fines <150 μm | |
| --- | --- | --- |
| | Reference | Formulation 1 |
| | XR | |
| Measurement 1 | 31.79 | 17.94 |
| Measurement 2 | 34.30 | 18.12 |

TABLE 3-continued

| | % fines <150 μm | |
|---|---|---|
| | Reference | Formulation 1 |
| Measurement 3 | 34.01 | 18.56 |
| Average | 33.37 | 18.21 |
| STDEVP | 1.12 | 0.26 |
| | AIXR | |
| Measurement 1 | 9.46 | 3.55 |
| Measurement 2 | 9.62 | 3.14 |
| Measurement 3 | 9.58 | 3.36 |
| Average | 9.55 | 3.35 |
| STDEVP | 0.07 | 0.17 |

Further preferred embodiments of the invention are:

Item 1. A composition comprising dicamba or salt thereof and a drift control agent, wherein the drift control agent comprises at least one fatty alcohol.

Item 2. The composition according to item 1, wherein the at least one fatty alcohol is a $C_{12}$-$C_{22}$-fatty alcohol.

Item 3. The composition according to item 1 or 2, wherein from about 3 wt. % to about 35 wt. % of the composition is the drift control agent, wherein the wt. % are based on the weight of the composition.

Item 4. The composition according to any one of items 1 to 3, wherein the composition is an aqueous composition.

Item 5. The composition according to any one of items 1 to 4, wherein the at least one fatty alcohol is a saturated fatty alcohol, an unsaturated fatty alcohol or a mixture thereof.

Item 6. The composition according to any one of items 1 to 5, wherein the drift control agent comprises oleyl alcohol, cetyl alcohol, myristic alcohol, arachidyl alcohol or a mixture thereof.

Item 7. The composition according to any one of items 1 to 6, wherein the drift control agent comprises from about 80 wt. % to about 98 wt. % of at least one unsaturated fatty alcohol and wherein the wt. % is based on the weight of the drift control agent.

Item 8. The composition according to item 7, wherein the at least one unsaturated fatty alcohol is oleyl alcohol.

Item 9. The composition according to any one of items 1 to 8, wherein the drift control agent comprises
  i. from about 80 wt. % to about 98 wt. % oleyl alcohol;
  ii. from about 1 wt. % to about 15 wt. % cetyl alcohol;
  iii. from about 0 wt. % to about 4 wt. % myristic alcohol; and
  iv. from about 0 wt. % to about 6 wt. % arachidyl alcohol;
  and wherein the wt. % are based on the weight of the drift control agent.

Item 10. The composition of item 9, wherein the wt. % sum of option i. to iv. represents at least about 81 wt. % and up to 100 wt. % of the drift control agent.

Item 11. The composition according to any one of items 1 to 10, wherein dicamba is present in form of a dicamba polyamine salt and the polyamine has the formula (A1)

(A1)

wherein $R^1$, $R^2$, $R^4$, $R^6$, and $R^7$ are independently H or $C_1$-$C_6$-alkyl, which is optionally substituted with OH, $R^3$ and $R^5$ are independently $C_2$-$C_{10}$-alkylene, X is OH or $NR^6R^7$, and
n is from 1 to 20;
or the formula (A2)

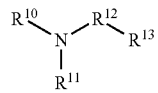

(A2)

wherein $R^{10}$ and $R^{11}$ are independently H or $C_1$-$C_6$-alkyl, $R^{12}$ is $C_1$-$C_{12}$-alkylene, and
$R^{13}$ is an aliphatic $C_5$-$C_8$ ring system, which comprises either nitrogen in the ring
or which is substituted with at least one unit $N^{10}R^{11}$.

Item 12. The composition of item 11, wherein dicamba is present in form of a N,N-bis(3-aminopropyl)methylamine salt.

Item 13. The composition of any one of items 1 to 12, wherein the composition does not comprise an alkoxylated fatty alcohol of formula (I),

wherein $R^a$ is $C_6$-$C_{22}$-alkyl and/or -alkenyl, m is 2, 3, 4 or a mixture thereof, and n is from 1 to 15.

Item 14. The composition according to any of items 1 to 12, wherein the drift control agent further comprises at least one alkoxylate of a fatty alcohol of formula (I),

wherein $R^a$ is $C_6$-$C_{22}$-alkyl and/or -alkenyl, m is 2, 3, 4 or a mixture thereof, and n is from 1 to 15.

Item 15. The composition according to item 14, wherein m is 2.

Item 16. The composition according to item 14 or 15, wherein the at least one alkoxylate of formula (I) or mixture thereof has an HLB value of 4.0 to 11.0.

Item 17. The composition according to any one of items 1 to 16, wherein the composition further comprises at least one anti-foaming agent.

Item 18. The composition of item 17, wherein the at least one anti-foaming agent comprises polydimethylsiloxane.

Item 19. The composition of item 17 or 18, wherein the at least one anti-foaming agent is between 0 wt. % and about 1 wt. % based on the total weight of the composition.

Item 20. The composition according to any one of items 1 to 19, wherein the composition further comprises at least one surfactant.

Item 21. The composition of item 20, wherein the surfactant comprises at least one ethoxylated tallow amine.

Item 22. The composition according to items 20 or 21, wherein the surfactant is between 0 wt. % and about 6 wt. % based on the weight of the composition.

Item 23. The composition according to any one of items 1 to 22 comprising at least 200 g/l acid equivalents of dicamba.

Item 24. The composition according to any one of items 1 to 23, wherein the composition comprises additional pesticides.

Item 25. The composition of item 24, wherein the additional pesticides comprise glyphosate.

Item 26. The composition according to any of items 1 to 25, wherein the composition is homogeneous.

Item 27. A method for preparing a tank mix which comprises the steps of
  b. providing a composition according to any of items 1 to 26, c. diluting the composition with water;
d. optional adding of further pesticides.

Item 28. The method of item 27, wherein the optional further pesticides comprise glyphosate.

Item 29. The method according to item 27 or 28, wherein the tank mix contains up to about 3 wt. % of the composition of item 1 to 25 based on the weight of the tank mix.

Item 30. The method according to item 27 to 29, wherein the tank mix contains up to about 1.0 wt. % of the drift control agent based on the weight of the tank mix.

Item. 31. A method for plant or seed or soil treatment with an effective amount of the composition according to any one of items 1 to 26, wherein the composition is allowed to act on the pest, and/or the plant to be protected and/or undesired plant and/or the soil and/or their environment.

Item 32. A method of item 31, wherein the composition is sprayed on the plants, seeds and/or soil.

Item 33. Use of at least one fatty alcohol as a drift control agent for reducing the wind drift of a composition comprising at least one pesticide and said at least one fatty alcohol.

Item 34. Use of item 33, wherein the at least one fatty alcohol comprises
 i. from about 80 wt. % to about 98 wt. % oleyl alcohol;
 ii. from about 1 wt. % to about 15 wt. % cetyl alcohol;
 iii. from about 0 wt. % to about 4 wt. % myristic alcohol; and
 iv. from about 0 wt. % to about 6 wt. % arachidyl alcohol;
and wherein the wt. % are based on the weight of the drift control agent.

Item 35. The use according to item 33 or 34, wherein the at least one pesticide comprises dicamba.

Item 36. Use of a composition of any one of items 1 to 26 for plant, seed or soil treatment.

The invention claimed is:

1. An aqueous composition comprising dicamba or salt thereof and a drift control agent; wherein the composition comprises at least 10 wt % drift control agent; and
 wherein the drift control agent comprises oleyl alcohol, cetyl alcohol, myristic alcohol, and arachidyl alcohol, in the amount of:
 i. from 80 wt. % to 98 wt. % oleyl alcohol;
 ii. from 1 wt. % to 15 wt. % cetyl alcohol;
 iii. from present up to 4 wt. % myristic alcohol; and
 iv. from present up to 6 wt. % arachidyl alcohol;
wherein the wt. % are based on the weight of the drift control agent.

2. The composition of claim 1, wherein dicamba is present in form of a diethylenetriamine salt of formula (A.1.1) or in the form of a N,N-bis(2-aminopropyl)methyl-amine salt of formula (A.1.2)

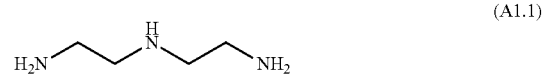

(A1.1)

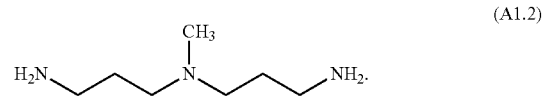

(A1.2)

3. The composition of claim 1, wherein the composition does not comprise an alkoxylated fatty alcohol of formula (I),

(I)

wherein $R^a$ is $C_6$-$C_{22}$-alkyl and/or -alkenyl, m is 2, 3, 4 or a mixture thereof, and n is from 1 to 15.

4. The composition of claim 1, wherein the drift control agent further comprises at least one alkoxylate of a fatty alcohol of formula (I),

(I)

wherein $R^a$ is $C_6$-$C_{22}$-alkyl and/or -alkenyl, m is 2, 3, 4 or a mixture thereof, and n is from 1 to 15.

5. The composition of claim 1, wherein the composition further comprises at least one anti-foaming agent.

6. The composition of claim 1, wherein the composition further comprises at least one surfactant.

7. The composition of claim 1, wherein the composition comprises additional pesticides.

8. A method for preparing a tank mix comprising the steps of
 a. providing the composition of claim 1;
 b. diluting the composition with water; and
 c. optionally adding further pesticides.

9. The method of claim 8, wherein the tank mix contains up to 3 wt. % of the composition based on the weight of the tank mix.

10. A method for plant or seed or soil treatment with an effective amount of the composition of claim 1, wherein the composition is allowed to act on the plant to be protected and/or undesired plant and/or the soil and/or the seed and/or their environment.

11. The method of claim 10, wherein the drift control agent consisting essentially of oleyl alcohol, cetyl alcohol, myristic alcohol, and arachidyl alcohol.

12. The method of claim 10, wherein the drift control agent comprises
 i. from 80 wt. % to 98 wt. % oleyl alcohol;
 ii. from 1 wt. % to 15 wt. % cetyl alcohol;
 iii. from present up to 4 wt. % myristic alcohol; and
 iv. from present up to 6 wt. % arachidyl alcohol;
 and wherein the wt. % are based on the weight of the drift control agent.

* * * * *

UNITED STATES PATENT AND TRADEMARK OFFICE
CERTIFICATE OF CORRECTION

| | |
|---|---|
| PATENT NO. | : 10,701,932 B2 |
| APPLICATION NO. | : 15/104413 |
| DATED | : July 7, 2020 |
| INVENTOR(S) | : Terrance Cannan et al. |

It is certified that error appears in the above-identified patent and that said Letters Patent is hereby corrected as shown below:

In the Claims

At Column 25, Line 45, "from present up" should be -- present up --.

At Column 25, Line 46, "from present up" should be -- present up --.

At Column 26, Line 48, "from present up" should be -- present up --.

At Column 26, Line 49, "from present up" should be -- present up --.

Signed and Sealed this
Sixteenth Day of April, 2024

Katherine Kelly Vidal
*Director of the United States Patent and Trademark Office*